US008931041B1

(12) United States Patent
Banerjee

(10) Patent No.: US 8,931,041 B1
(45) Date of Patent: Jan. 6, 2015

(54) METHOD AND SYSTEM FOR VISIBILITY AND CONTROL OVER ACCESS TRANSACTIONS BETWEEN CLOUDS USING RESOURCE AUTHORIZATION MESSAGES

(75) Inventor: Deb Banerjee, Cupertino, CA (US)

(73) Assignee: Symantec Corporation, Mountain View, CA (US)

(*) Notice: Subject to any disclaimer, the term of this patent is extended or adjusted under 35 U.S.C. 154(b) by 211 days.

(21) Appl. No.: 13/194,710

(22) Filed: Jul. 29, 2011

(51) Int. Cl.
*H04L 29/06* (2006.01)
*G06F 21/33* (2013.01)

(52) U.S. Cl.
CPC ............ *H04L 63/102* (2013.01); *G06F 21/335* (2013.01); *H04L 63/0407* (2013.01)
USPC .......................................................... 726/1

(58) Field of Classification Search
USPC .......................................................... 726/1
See application file for complete search history.

(56) References Cited

U.S. PATENT DOCUMENTS

| 2012/0005238 | A1* | 1/2012 | Jebara et al. ............... 707/798 |
| 2012/0117626 | A1* | 5/2012 | Yates et al. .................. 726/4 |
| 2012/0204221 | A1* | 8/2012 | Monjas Llorente et al. ...... 726/1 |
| 2012/0304265 | A1* | 11/2012 | Richter et al. .................. 726/7 |

FOREIGN PATENT DOCUMENTS

| WO | WO 2010068840 A1 | * | 6/2010 |
| WO | WO 2011047722 A1 | * | 4/2011 |

OTHER PUBLICATIONS

Alhamad, Mohammed, Tharam Dillon, and Elizabeth Chang. "Sla-based trust model for cloud computing." In Network-Based Information Systems (NBiS), 2010 13th International Conference on, pp. 321-324. IEEE, 2010.*

* cited by examiner

*Primary Examiner* — Vikkram Bali
*Assistant Examiner* — Tracy Mangialaschi
(74) *Attorney, Agent, or Firm* — Lowenstein Sandler LLP

(57) ABSTRACT

A computing system detects an access transaction based on one or more resource authorization messages transmitted via a resource authorization protocol. The access transaction pertains to access of a protected resource by a consumer cloud, the protected resource hosted by a provider cloud. The computing system generates relationship data based on the resource authorization messages. The relationship data can indicate a resource owner that is granting the access, the consumer cloud, and/or the provider cloud. The computing system performs an access control action in relation to the access transaction based on the relationship data. The access control action can be allowing the consumer cloud access to the protected resource or denying the consumer cloud access to the protected resource.

20 Claims, 5 Drawing Sheets

METHOD AND SYSTEM FOR VISIBILITY AND CONTROL OVER ACCESS TRANSACTIONS BETWEEN CLOUDS USING RESOURCE AUTHORIZATION MESSAGES

TECHNICAL FIELD

Embodiments of the present invention relate to cloud computing. Specifically, the embodiments of the present invention relate to visibility and control over access transactions between clouds using resource authorization messages.

BACKGROUND

Enterprise clouds can provide solutions to enterprises using cloud computing and software as a service (SaaS) to distribute software on a subscription basis. For example, cloud computing company Salesforce.com® can host Customer Relationship Management (CRM)/Salesforce Automation applications and services offsite via a cloud. In another example, Google Inc. can host Google Docs™, which is a web-based word processor, spreadsheet, presentation, form, and data storage service, as a SaaS solution, via a cloud. Enterprises can use a variety of SaaS clouds to conduct their business. For example, enterprise users can access the Google Docs™ cloud for unstructured data and can access the Salesforce® cloud for CRM/Salesforce Automation services and applications.

Clouds can exchange protected resources directly amongst themselves on behalf of their users based on user privileges, which users can grant to resources hosted in their cloud accounts using a resource authorization protocol, such as an OAuth (Open Authentication) protocol. For example, a user can grant the Google Docs™ cloud access to his/her protected resources hosted by the Salesforce.com® cloud. The user can use the OAuth protocol to authorize sharing of their private resources stored in the Salesforce.com® cloud with the Google Docs™ cloud while avoiding to have to expose their Salesforce.com® cloud credentials, typically Salesforce-.com® cloud username and password, to the Google Docs™ cloud. However, conventional environments where private resources are being shared between clouds over the OAuth protocol fail to provide Enterprise security administrators visibility as to what data is being shared, which users are authorizing the sharing, and which clouds are accessing the shared data. Enterprises may wish to prevent sensitive enterprise data from flowing from one cloud to another cloud, but are unable to because they are not aware of the cloud provider access transactions.

Some clouds use whitelists and blacklists to prevent sensitive data from being shared. However, such conventional solutions may not always offer the required agility to Enterprises. New SaaS clouds may surface, and new services within existing SaaS clouds continually become newly available. Thus, whitelists and blacklists are often outdated and may inadvertently allow sensitive enterprise data to be shared.

SUMMARY

In one embodiment, a system for visibility and control over access transactions between clouds using resource authorization messages is described. An exemplary system may include a memory and a processing device that is coupled to the memory. In one embodiment, the system detects an access transaction based on resource authorization messages transmitted via a resource authorization protocol and generates relationship data based on the resource authorization messages. The access transaction pertains to access of a protected resource by a consumer cloud. The protected resource is hosted by a provider cloud. The relationship data indicates the resource owner that is granting the access, the consumer cloud, and/or the provider cloud. The system performs an access control action in relation to the access transaction based on the relationship data, which can allow the consumer cloud access to the protected resource or deny the consumer cloud access to the protected resource.

In one embodiment, the resource authorization protocol is Open Authorization (OAuth) protocol. In one embodiment, the system accesses resource authorization messages originating from outside an enterprise firewall.

In some embodiments of the exemplary system, the memory stores policy data that specifies cloud type criteria for access control actions and stores security profile data for resource owners indicating a security level for a resource owner. In one embodiment, the system generates a cloud trust model based on the relationship data, the security profile data, and the policy data. The cloud trust model indicates a degree of a consumer cloud being a trusted cloud. In one embodiment, the system detects a subsequent access transaction based on subsequent resource authorization messages. The access transaction pertains to access of a protected resource by a consumer cloud. The protected resource is stored by a provider cloud. The system generates relationship data based on the subsequent resource authorization messages. The system then updates the cloud trust model based on the relationship data pertaining to the subsequent access transaction.

In one embodiment, the system implements the cloud trust model as a graph model and determines the access control action to perform using a belief propagation technique and the graph model. The graph model comprises nodes and edges connecting at least a subset of the nodes. The nodes represent users, consumer clouds, and provider clouds, and the edges represent relationships between the nodes.

In one embodiment, the system further comprises a reverse proxy or forward proxy to intercept resource authorization messages originating from outside an enterprise firewall.

In addition, a non-transitory computer readable storage medium for visibility and control over access transactions between clouds using resource authorization messages is described. An exemplary non-transitory computer readable storage medium includes instructions that will cause a processor to detect an access transaction based on resource authorization messages that are transmitted via a resource authorization protocol. The processor then generates relationship data based on the resource authorization messages and performs an access control action in relation to the access transaction based on the relationship data.

Further, a method for visibility and control over access transactions between clouds using resource authorization messages is described. In one embodiment, a method comprises detecting an access transaction based on resource authorization messages that are transmitted via a resource authorization protocol, generating relationship data based on the resource authorization messages, and performing an access control action in relation to the access transaction based on the relationship data.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one"

embodiment in this disclosure are not necessarily to the same embodiment, and such references mean at least one.

DETAILED DESCRIPTION

Embodiments of the invention are directed to a method and system for providing visibility and control over access transactions between clouds using resource authorization messages. A computing system detects an access transaction based on one or more resource authorization messages transmitted via a resource authorization protocol. The access transaction pertains to access of a protected resource by a consumer cloud. The protected resource is hosted by a provider cloud. The computing system generates relationship data based on the resource authorization messages. The relationship data can indicate a resource owner that is granting the access, the consumer cloud, and/or the provider cloud. The computing system performs an access control action in relation to the access transaction based on the relationship data. The access control action can allow the consumer cloud access to the protected resource or deny the consumer cloud access to the protected resource.

A protected resource is an access restricted resource that requires authentication and authorization before the protected resource can be accessed. For example, a protected resource may be a contact list that requires a username and password for access to the contact list. A resource authorization protocol is a protocol that authorizes authenticated entities to share protected resources with one another without having to disclose authentication credentials. An example of a resource authorization protocol is OAuth (Open Authorization) protocol. For brevity and simplicity, the OAuth protocol is used as an example of a resource authorization protocol throughout this document.

Embodiments of the present invention can use resource authorization messages, such as OAuth messages, to generate relationship data for a cloud trust model, and can provide the relationship data to users having special access rights, such as Enterprise security administrators, to give the security administrators visibility to the cloud access transactions that are occurring within and outside an enterprise firewall. The cloud trust model can be implemented as a graph model. Embodiments can also apply enterprise policies to the resource authorization protocol traffic, such as OAuth traffic, to provide enterprises with control over which access transactions to allow.

Furthermore, conventional cloud whitelists and blacklists may not always offer the required agility to enterprises. New SaaS clouds may surface, and new services within existing SaaS clouds continually become newly available. While observing the flow of resource authorization messages for access transactions between the clouds as they occur, embodiments can dynamically generate and/or update a cloud trust model based on the relationship data as the transactions occur without using whitelists and/or blacklists.

Figure 1:
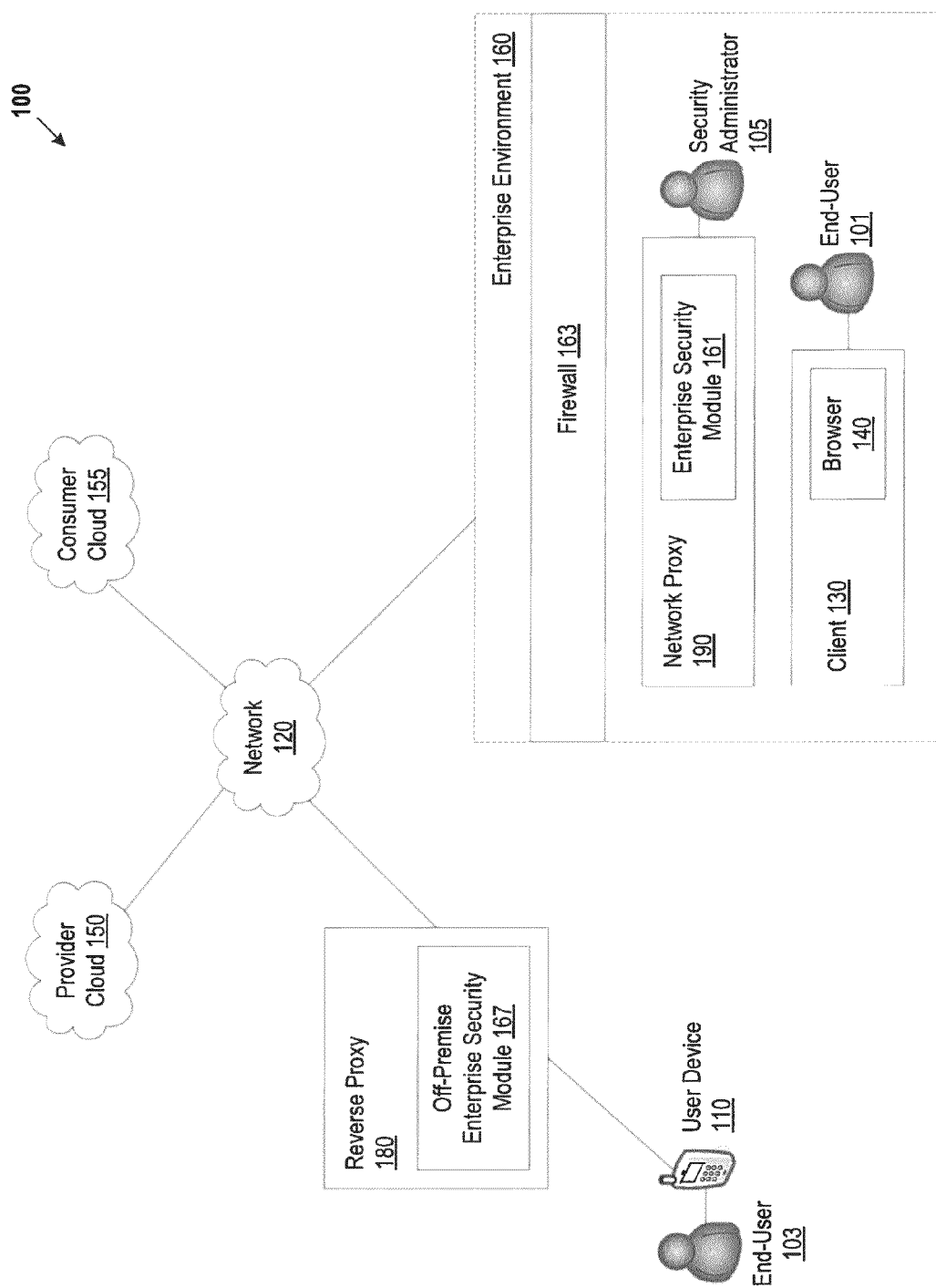
FIG. 1 is an exemplary network architecture in which embodiments of the present invention may operate.

FIG. 1 is an exemplary network architecture 100 in which embodiments of the present invention can be implemented. The network architecture 100 can include an enterprise environment 160 including one or more clients 130 communicating with one or more clouds 150,155 via a network 120. The network 120 can be a local area network (LAN), a wireless network, a mobile communications network, a wide area network (WAN), such as the Internet, or similar communication system. The network 120 can include any number of networking and computing devices such as wired and wireless devices.

A cloud 150,155 can provide solutions to enterprises using cloud computing such as a SaaS model in which cloud computing companies can distribute software on a subscription basis. A cloud 150,155 can include one or more servers to implement the SaaS model. A server can be hosted by any type of computing device including server computers, gateway computers, desktop computers, laptop computers, handheld computers or similar computing device.

For example, cloud computing company Salesforce.com® can host CRM/Salesforce Automation applications and services offsite via cloud 150. In another example, Google Inc. can host Google Docs™ as a SaaS solution via cloud 155. Enterprises can use a variety of SaaS clouds 150,155 to conduct their business. For example, enterprise end-users 101, 103 can access the Google Docs™ cloud 155 for unstructured data and can access the Salesforce® cloud 150 for CRM/Salesforce Automation services and applications. End-users 101,103 are users of clouds 150,155. A user that has special access rights, such as an enterprise security administrator 105, can not only use clouds 150,155, but can set enterprise policies.

The enterprise environment 160 can include a firewall 163 to create a secure boundary for the enterprise. In one embodiment, an end-user 101 can access the clouds 150,155 from within the firewall 163, also known as within the enterprise premise and 'on-premise.' A client 130 can host a web browser 140, or similar application, to access the clouds 150,155 from within the firewall 163. A client 130 can be hosted by any type of computing device including server computers, gateway computers, desktop computers, laptop computers, mobile communications devices, cell phones, smart phones, hand-held computers, or similar computing device.

The clouds 150,155 can exchange protected resources directly amongst themselves based on user privileges, which end-users 101,103 can grant using a resource authorization protocol, such as an OAuth protocol. A protected resource is owned by a resource owner, such as an enterprise end-user 101,103. For example, an end-user 101,103 can grant the Google Docs™ cloud 155 access to his/her protected resource that is hosted by the Salesforce® cloud 150, and vice-versa. OAuth is a multi-step authorization protocol that allows end-users 101,103 to share their protected resources that are stored on one cloud with another cloud without having an end-user 101,103 expose his/her user credentials. A cloud that is hosting protected resources can be referred to as a 'provider cloud'. A cloud that is accessing protected resources from a provider cloud can be referred to as a 'consumer cloud'.

A resource authorization protocol redirects messages being exchanged between a provider cloud 150 and a consumer cloud 155 to a web browser 140. For example, OAuth messages that are exchanged between the clouds 150,155 are first redirected to the browser 140. One or more network proxies 190 can be configured to detect and intercept the resource authorization messages (e.g., OAuth messages) being redirected to the web browser 140 to generate and store relationship data to be used to generate a cloud trust model for tracking 'access transactions'. The cloud trust model can be implemented as a graph model. For brevity and simplicity, the configuration of access and an attempt to configure access for a consumer cloud to a protected resource hosted by a provider cloud is hereinafter referred to as an 'access transaction'.

The resource authorization traffic (e.g., OAuth traffic) intercepted by the proxies 190 can include resource authorization messages, such as OAuth messages, which relate to an access transaction. An access transaction can include one or more resource authorization messages. For example, a proxy 190 may intercept a first message relating to an access transaction, which is sent by a consumer cloud 155 to an end-user 101 requesting authorization from the end-user 101 to access protected resources in a provider cloud 150. The proxy 190 may subsequently intercept a second message relating to the same access transaction, which is sent by the end-user 101 to the consumer cloud 155 as a response to grant authorization to the consumer cloud 155.

The proxy 190 can include an enterprise security module 161 to use the intercepted resource authorization messages to generate and store relationship data for tracking access transactions. The relationship data can include which end-users are granting access to which consumer clouds, as well as the particular protected resource relating to the access, and the provider cloud for each access transaction. The enterprise security module 161 can provide the relationship data to one or more users having special access rights, such as an enterprise security administrator 105, to give the security administrator 105 visibility to the cloud access transactions that are occurring within the firewall 163. The enterprise security module 161 can also apply enterprise policies to the resource authorization traffic (e.g., OAuth traffic) to provide a user 105 control over which access transactions to allow. A security administrator 105 can define the enterprise policies that are applied to the OAuth traffic.

For example, the enterprise security module 161 may allow certain end-users 101 to grant access to consumer clouds 155 and may prevent certain end-users 101 from granting access to particular consumer clouds 155. One embodiment of using policies and the relationship data to determine whether to allow or deny a consumer cloud access to a protected resource is described in greater detail below in conjunction with FIG. 3. The enterprise security module 161 can also dynamically build a cloud trust model based on the resource authorization traffic (e.g., OAuth traffic) and relationship data. The cloud trust model can be implemented as a graph model. The graph model can include nodes and edges connecting at least a subset of the nodes. The nodes can represent end-users, consumer clouds, and provider clouds. The edges can represent relationships between the nodes. The cloud trust model is an abstract representation of relationships between users, cloud consumers, and cloud providers. The cloud trust model can represent relationships between any number of consumer clouds and provider clouds, and any number of resources owners. For example, a cloud trust model can represent that an end-user 101 is the CEO of the enterprise and has granted the consumer cloud 155 Google Docs™ access to his/her protected resources in the provider cloud 150 Salesforce.com®. The cloud trust model can also represent that consumer cloud 155 Google Docs™ is a highly trusted cloud and that the provider cloud 150 Salesforce.com® is also a highly trusted cloud. The enterprise security module 161 can use the cloud trust model to implement the policies. One embodiment of dynamically generating a cloud trust model and using the cloud trust model to control access transactions between clouds is described in greater detail below in conjunction with FIG. 4.

The one or more network proxies 190 can communicate to the clients 130 via a network (not shown). A network proxy 190 may be a web proxy. The network proxy 190 can be deployed and managed by an enterprise. A network proxy 190 can be implemented behind a firewall 163 between a client application, such as the web browser 140, and the clouds 150,155. A network proxy 190 can be hosted computing devices including server computers, gateway computers, or similar computing devices. An exemplary computing device is described in greater detail below in conjunction with FIG. 5.

In one embodiment, an enterprise end-user, such as end-user 103, can use a user device 110 which communicates with one or more clouds 150,155 from outside the enterprise firewall 163, also known as outside the enterprise premise and 'off-premise'. A user device 110 can be hosted by any type of computing device including desktop computers, laptop computers, mobile communications devices, cell phones, smart phones, hand-held computers, or similar computing devices capable of communicating with the clouds 150,155.

A user device 110 can communicate to the clouds 150,155 from outside the enterprise firewall 163 via one or more reverse proxies 180 or forward proxies. A user device 110 can host a web browser, or similar application, to access the clouds 150,155 via a reverse proxy or a forward proxy 180. A user device 110 can be provisioned with URLs (uniform resource locators) of the service names of the clouds 150,155. The service names can force the user device 110 to connect to a reverse or forward proxy 180 to communicate to the clouds 150,155.

The one or more reverse or forward proxies 180 can detect and intercept off-premise resource authorization traffic (e.g., OAuth traffic), for example, between a user device 110 and the clouds 150,155. The reverse or forward proxies 180 can intercept resource authorization messages to generate and store relationship data for tracking access transactions occurring outside the firewall 163. A reverse or forward proxy 180 can include an off-premise enterprise security module 167 to use the intercepted OAuth traffic to generate and store the relationship data for tracking access transactions. In one embodiment, the off-premise enterprise security module 167 communicates with the enterprise security module 161 via the network 120 to request the enterprise security module 161 to generate and store the relationship data for an access transaction based on the intercepted messages. The enterprise security module 161 can determine which access control action should be performed by the off-premise enterprise security module 167 based on a policy and the relationship data and instructs the off-premise enterprise security module 167 to perform the access control action.

In another embodiment, the off-premise enterprise security module 167 and the enterprise security module 161 each perform the same functions. The off-premise enterprise security module 167 can generate and locally store relationship data and enterprise policies and can determine which access control action to perform based on the locally stored data. The off-premise enterprise security module 167 can synchronize its locally stored data with data that is maintained by the enterprise security module 161. The reverse or forward proxies 180 can be deployed and managed by an enterprise. A reverse or forward proxy 180 can be hosted by any type of computing device including server computers, gateway computers, or similar computing devices. An exemplary computing device is described in greater detail below in conjunction with FIG. 5.

Figure 2:
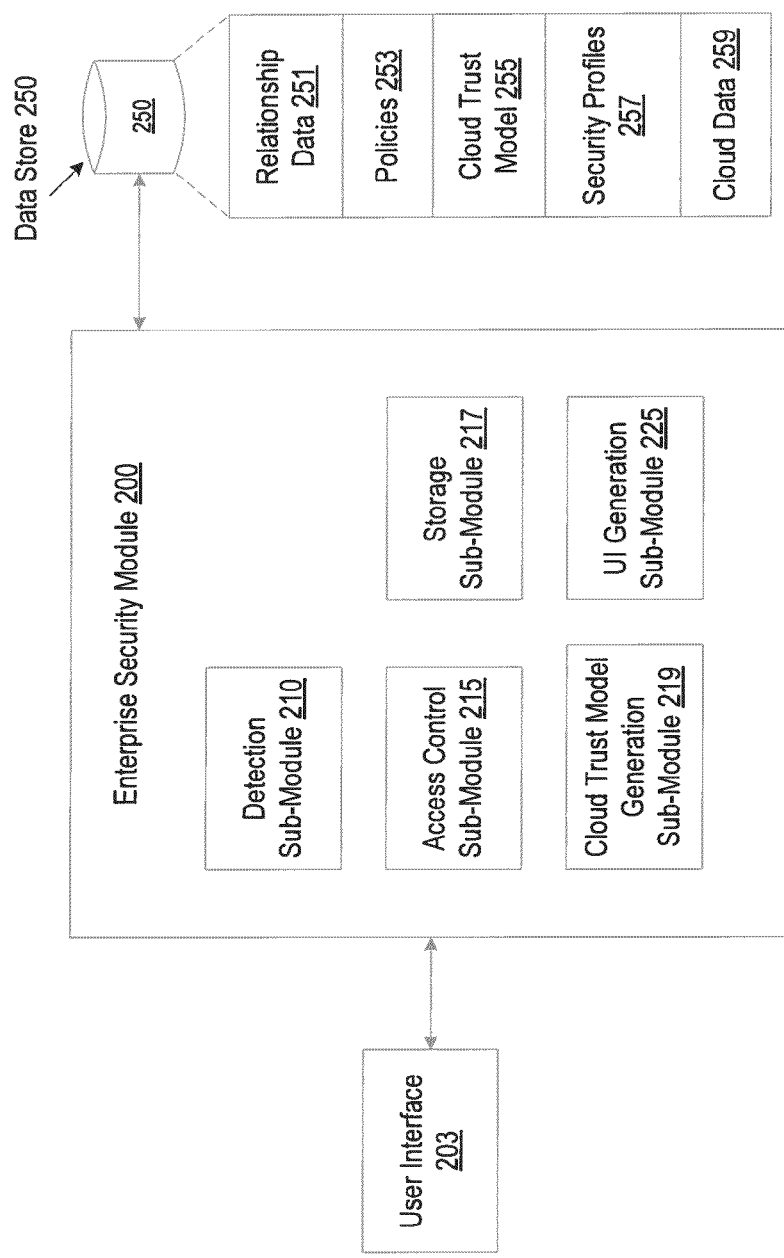
FIG. 2 is a block diagram of one embodiment of an enterprise security module for visibility and control over access transactions between clouds using resource authorization messages transmitted via a resource authorization protocol.

FIG. 2 is a block diagram of one embodiment of an enterprise security module for visibility and control over access transactions between clouds using resource authorization messages (e.g., OAuth messages) transmitted via a resource authorization protocol. The enterprise security module 200 may be the same as the enterprise security module 161 in the network architecture 100 of FIG. 1. In one embodiment, the enterprise security module 200 may be the same as the off-premise enterprise security module 167 in the network architecture 100 of FIG. 1. The enterprise security module 200 includes a detection sub-module 210, an access control sub-module 215, a storage sub-module 217, a cloud trust model generation sub-module 219, and a user interface (UI) generation sub-module 225. The sub-modules can be combined together or separated in further sub-modules, according to a particular embodiment.

The detection sub-module 210 can access and examine the resource authorization messages intercepted by a proxy to detect an access transaction. Resource authorization messages, such as OAuth messages, are exchanged via HTTP (Hypertext Transfer Protocol) or HTTPS (Hypertext Transfer Protocol Secure). A resource authorization protocol may support various authorization grant types. An authorization grant is used by a consumer cloud to obtain an access token for use in accessing protected resources. The detection sub-module 210 can identify data, such as grant type data, in a resource authorization message to determine that the message relates to an access transaction, and whether to allow the transaction to proceed. The detection sub-module 210 can use other data in a resource authorization message, such as redirect data, to determine that the message relates to an access transaction.

The cloud trust model generation sub-module 219 can generate relationship data 251 based on the resource authorization messages relating to the detected access transaction. Examples of relationship data 251 can include, and are not limited to, the consumer cloud that is being granted access, the resource owner granting the access, the protected resource to be accessed, and the provider cloud hosting the protected resource. The storage sub-module 217 can store the relationship data 251 in a data store 250 that is coupled to the enterprise security module 200. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The storage sub-module 217 can receive user input from a user having special access rights, such as input from an enterprise security administrator, via a user interface 203 that is coupled to the enterprise security module 200, to assign a security level to a resource owner (e.g., enterprise end-user) and store the assigned security levels as security profiles 257. Examples of security levels can include, and are not limited to, a high security level, a medium security level, and a low security level. The storage sub-module 217 can store the security profiles 257 reflecting the security level assignments in the data store 250. The user interface 203 can be a graphical user interface (GUI). The user interface (UI) generation sub-module 225 can generate a GUI to receive the user input.

The cloud trust model generation sub-module 219 can receive end-user input via a network proxy, for example, in the form of resource authorization traffic (e.g., OAuth traffic) intercepted by the network proxy/ The end-user input can include resource authorization messages, such as OAuth messages, which relate to an access transaction. The cloud trust model generation sub-module 219 can use data from the end-user input to assign a cloud type to a cloud. The cloud trust model generation sub-module 219 can use a belief propagation technique to assign a cloud type to a cloud. Examples of cloud types can include, and are not limited to, a high-trust cloud, a medium-trust cloud, a low-trust cloud, and an unknown cloud. For example, end-users that are providing the end-user input can be an enterprise executives, such as a CEO (chief executive officer), a CIO (chief information officer), and a CFO (chief financial officer). The storage sub-module 217 can receive input from the cloud trust generation model sub-module 219 to store cloud data 259 that reflects the cloud type assignments in the data store 250. The storing sub-module 217 can also assign a default cloud type, such as 'unknown cloud,' to a cloud.

Enterprises can define and store policies 253 to specify, for example, what types of cloud data can be shared between the clouds, what security level a resource owner should have to allow an access transaction, what cloud type a consumer cloud should have to allow an access transaction, etc. For instance, enterprises may wish to prevent sensitive data from flowing from a high-trust cloud to a low-trust cloud, and a policy 253 may specify that the consumer cloud access should be prevented when a resource owner has a low security level and the consumer cloud is a low-trust cloud type. The storing sub-module 217 can receive user (e.g., system administrator) input via the UI 203 that defines the policies 253 and store the policies 253 in the data store 250.

The access control sub-module 215 can perform one or more access control actions in relation to the access transaction based on the relationship data 251 for the access transaction. Examples of an access control action can include, and are not limited to, allowing a consumer cloud access to a protected resource, denying a consumer cloud access to a protected resource, sending notifications of the consumer cloud access to one or more users, triggering a management workflow, etc.

In one embodiment, the access control sub-module 215 uses the security profiles 257, the cloud data 259, and the policies 253 to determine which access control action to perform. One embodiment for controlling access transactions using policies, security profiles, and cloud data is described in greater detail below in conjunction with FIG. 3. In another embodiment, the access control sub-module 215 determines which access control action to perform based on whitelists and/or blacklists. In another embodiment, the access control sub-module 215 determines which access control action to perform based on a cloud trust model. The cloud trust model indicates a degree (level) of a consumer cloud being a trusted cloud. In one embodiment, the cloud trust model is implemented as a graph model and the enterprise security module uses belief propagation techniques to determine which access control action to perform. Belief propagation is a message passing algorithm for performing inference on graph models that calculates the marginal distribution for each unobserved node, conditional on any observed nodes in a graph model. One embodiment for controlling access transactions using the cloud trust model is described in greater detail below in conjunction with FIG. 4.

The cloud trust model generation sub-module 219 can use the relationship data 251 to create a cloud trust graph model, which is an abstract representation of the relationships between users, cloud consumers, and cloud providers. The graph model can include nodes and edges connecting at least a subset of the nodes. The nodes can represent end-users, consumer clouds, and provider clouds. The edges can represent relationships between the nodes. The cloud trust model represents relationships between any number of consumer clouds and provider clouds, and any number of resources owners. The storage sub-module 217 can store the cloud trust model 255 in the data store 250. Generating a cloud trust model can include updating an existing cloud trust model 255. The model generation sub-module 219 can observe the flow of resource authorization messages for access transactions between the clouds as they occur and dynamically generate and/or update a cloud trust model 255 based on the relationship data 251 that identifies the consumer clouds, provider clouds, and users for the various access transactions. The model generation sub-module 219 can dynamically build a cloud trust model 255 without using whitelists and/or blacklists. One embodiment for generating a cloud trust model is described in greater detail below in conjunction with FIG. 4.

Figure 3:
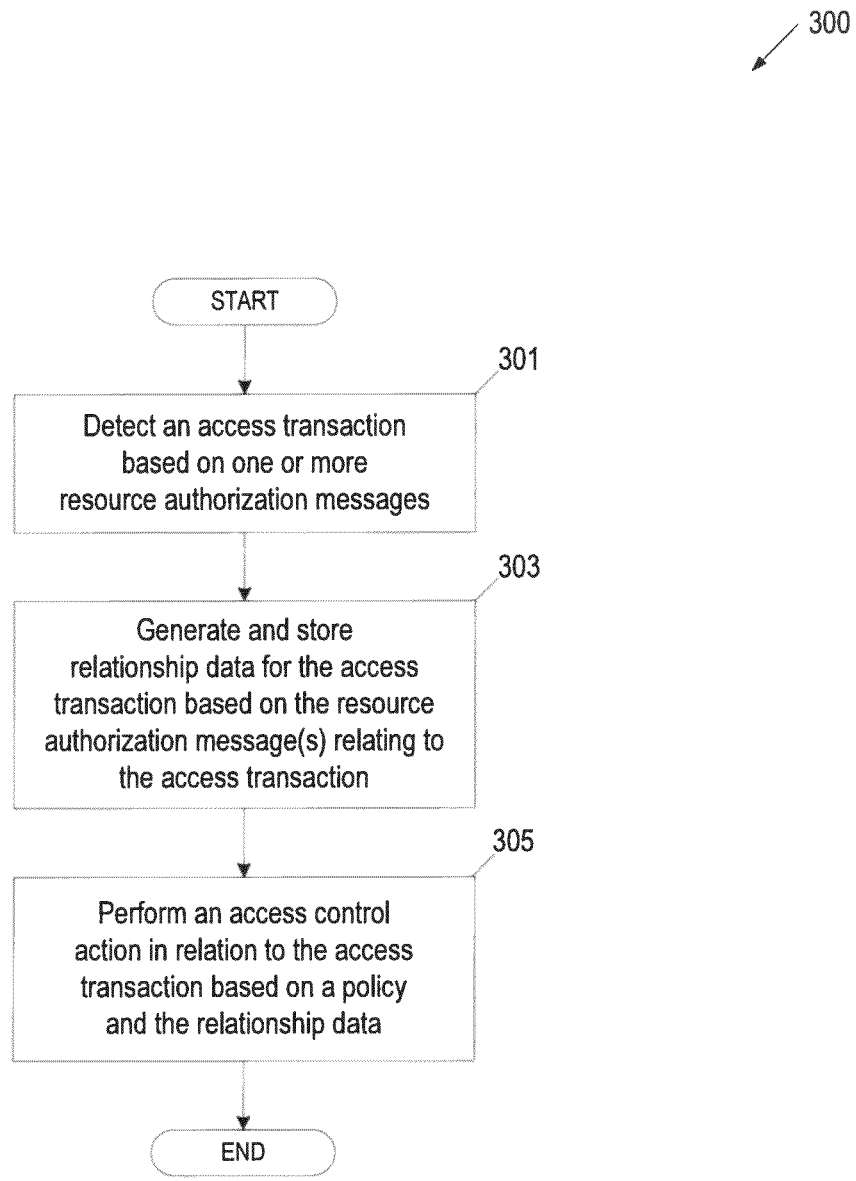
FIG. 3 is a flow diagram of an embodiment of a method for visibility and control over access transactions between clouds using resource authorization messages.

FIG. 3 is a flow diagram of an embodiment of a method 300 for visibility and control over access transactions between clouds using resource authorization messages. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by an enterprise security module 161 of FIG. 1. In another embodiment, method 300 is performed by an off-premise enterprise security module 167 of FIG. 1. Method 300 can be a recursive process in which the enterprise security module is continually examining resource authorization messages, detecting access transactions, and performing access control actions for each access transaction.

At block 301, the enterprise security module analyzes resource authorization messages (e.g., OAuth messages) that are being intercepted by a proxy and detects an access transaction based on the resource authorization messages. An access transaction can include one or more resource authorization messages. For example, a proxy may intercept a first message for an access transaction, which is sent by a consumer cloud to a resource owner requesting authorization from the resource owner. The proxy may subsequently intercept a second message relating to the same access transaction, which is sent by the resource owner to the consumer cloud as a response to grant authorization to the consumer cloud.

Other examples of resource authorization messages, which the enterprise security module can use to detect an access transaction, include resource authorization messages relating to an authorization server providing an access token to a consumer cloud. An access token can be a string denoting a specific scope, duration, and other access attributes. A consumer cloud can use an access token to access the protected resources hosted by a provider cloud. A token allows an enterprise end-user to grant a consumer cloud access to their information stored with a provider cloud, without sharing their access credentials (e.g., username and password to access the provider cloud).

At block 303, the enterprise security module generates relationship data based on the one or more resource authorization messages relating to the detected access transaction. Examples of relationship data can include, and are not limited to, the consumer cloud that is being granted access, the resource owner granting the access, the protected resource to be accessed, and the provider cloud hosting the protected resource. The enterprise security module can identify a resource owner using a user identifier, such as a user name, a user employee identifier, a device identifier that is associated with the user, etc., when generating and storing the relationship data. The enterprise security module can use a cloud identifier, such as a service name, a network identifier, a device identifier that is associated with a cloud, etc., when generating and storing the relationship data. The relationship data can be stored in a data store that is coupled to the enterprise security module. The relationship data can be stored as a relational database, spreadsheet, flat file, etc.

At block 305, the enterprise security module performs one or more access control actions in relation to the access transaction based on the relationship data for the access transaction. Examples of an access control action can include, and are not limited to, allowing a consumer cloud access to a protected resource, denying a consumer cloud access to a protected resource, sending notifications of the consumer cloud access to one or more users (e.g., end-users, security administrators, etc.), triggering a management workflow, etc. Examples of a notification can include, and are not limited to, messages communicated over a network (e.g., email messages, text messages, instant messages, social network messages, etc.), visual/sound alarm indicators on a computer system, etc.

In one embodiment, the enterprise security module uses policies and security profiles that are stored in the data store to determine which access control action to perform. In another embodiment, the enterprise security module determines which access control action to perform based on whitelists and/or blacklists. One embodiment for controlling access transactions using the cloud trust model is described in greater detail below in conjunction with FIG. 4.

The security profiles can include a security level for the resource owners (e.g., enterprise end-users). The enterprise security module can use a user identifier to search the security profiles to determine the security level of the end-user. In one embodiment, an employee grade level and/or an employee title can be associated with a particular security level. For example, an enterprise end-user at an executive level, such as a CEO, CIO, CFO, etc., may be assigned a high level of security, end-users at the director level may be assigned a medium level of security, and end-users below the director level may be assigned a low level of security.

A policy can include a set of rules that specify, for example, what security level a resource owner should have to allow an access transaction, what cloud type a consumer cloud should have to allow an access transaction, etc. The enterprise security module can use the security profiles and relationship data to determine whether an access transaction satisfies the rules of a policy. Further, policies can specify which access control actions should be taken when the rules are satisfied and when the rules are not satisfied. For example, the policy may require that the access to the protected resources be blocked, reported, etc. when the rules are not satisfied and may allow the access when the rules are satisfied.

A policy can specify security level criteria and cloud type criteria and a corresponding access control action to perform. For example, a policy may prevent access or further access by a consumer cloud when the end-user has a low security level and the consumer cloud is not designated with the appropriate cloud type. The enterprise security module can access cloud data that is stored in the data store to determine the cloud type that is assigned to a consumer cloud. In one embodiment, the enterprise security module generates a cloud trust model to designate a cloud type to a consumer cloud.

Figure 4:
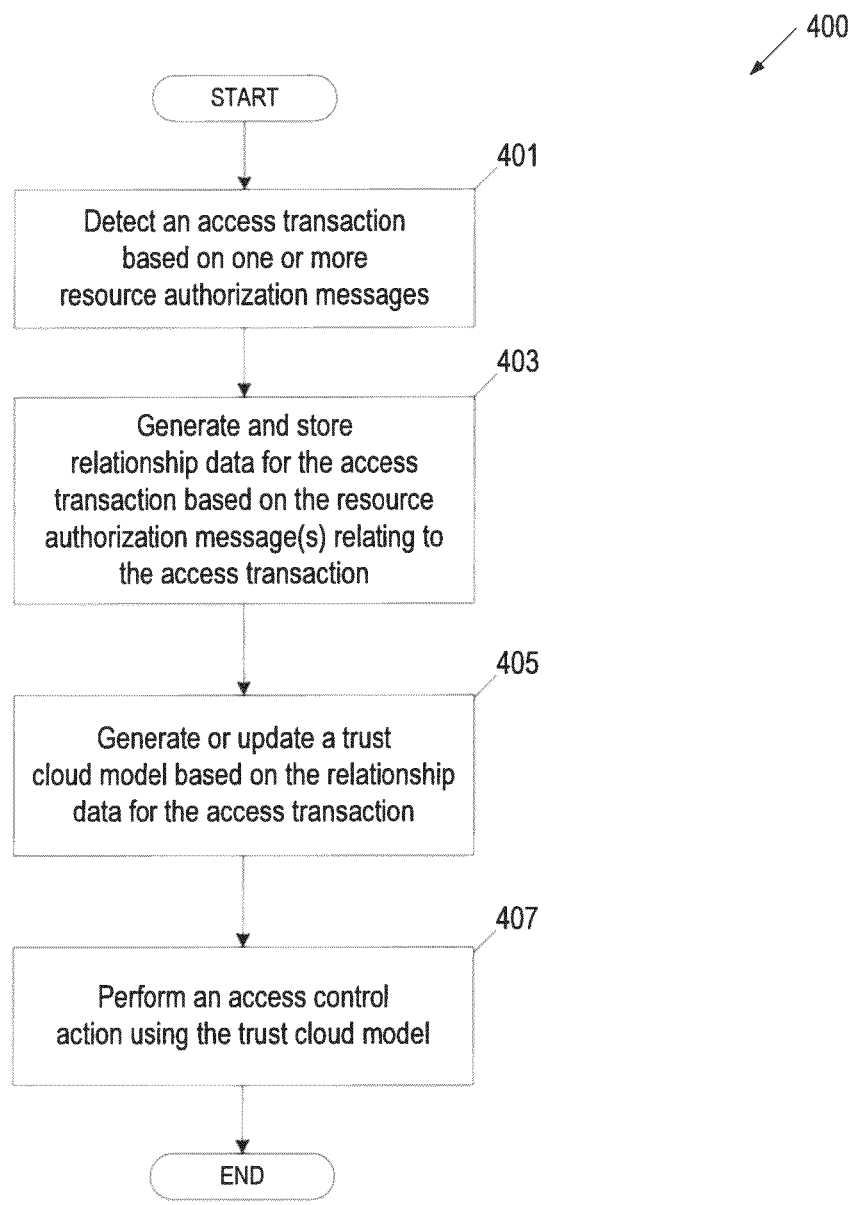
FIG. 4 is a flow diagram of an embodiment of a method for dynamically generating a cloud trust model and controlling access transactions using the cloud trust model.

FIG. 4 is a flow diagram of an embodiment of a method 400 for dynamically generating a cloud trust model and controlling access transactions using the cloud trust model. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an enterprise security module 161 of FIG. 1. In another embodiment, method 400 is performed by an off-premise enterprise security module 167 of FIG. 1.

At block 401, the enterprise security module analyzes resource authorization messages that are being intercepted by a proxy and detects an access transaction based on the resource authorization messages. At block 403, the enterprise security module generates relationship data based on the resource authorization messages relating to the detected access transaction. At block 405, the enterprise security module dynamically generates a cloud trust model or dynamically updates an existing cloud trust model based on the relationship data for the access transaction. A cloud trust model can represent relationships between any number of consumer clouds and provider clouds, and any number of resources owners. A cloud trust model indicates the cloud type that is assigned to a cloud by the enterprise and the one or more resource owners that have granted or attempted to grant access to a consumer cloud. An enterprise can associate a level of trust with a cloud. Examples of cloud types can include, and are not limited to, an unknown cloud and various trusted cloud types, such as a high-trust cloud, a medium-trust cloud, and a low-trust cloud.

At block 407, the enterprise security module performs an access control action using the cloud trust model. In one embodiment, the cloud trust model is implemented as a graph model, and the enterprise security module determines which access control action to take using a belief propagation technique. The enterprise security module can also use policies to determine which access control action to perform.

Method 400 can be a recursive process in which the enterprise security module is continually examining resource authorization messages, detecting access transactions, and generating relationship data for each access transaction. The enterprise security module can dynamically update the cloud trust model to reflect newly generated relationship data. The cloud trust model can be updated such that the cloud type for a consumer cloud can dynamically change, for example, from an unknown cloud type to a high-trust cloud type. A change in the cloud type can result in different access control actions that are subsequently being performed.

For example, the enterprise security module detects an access transaction from the OAuth messages, where an enterprise end-user, John Smith, is granting a consumer cloud, Google Docs™ cloud, access to a subset of his protected resources stored by the provider cloud, Salesforce® cloud. The enterprise security module stores relationship data that reflects this access transaction, searches the security profiles for the security profile of John Smith, and determines that he is the an employee that has a low security level. An existing cloud trust model indicates that the provider cloud, Salesforce® cloud, is a high-trust cloud and that the consumer cloud, Google Docs™ cloud, is an unknown cloud. The enterprise security module applies a policy that specifies that the enterprise security module is to prevent access or further access by the consumer cloud when the end-user has a low security level and the consumer cloud is not designated as a high-trust cloud. The enterprise security module determines that the relationship data for the access transaction fails to satisfy the policy criteria and causes the Google Docs™ cloud to not have access to John Smith's protected resources hosted by the Salesforce® cloud. The enterprise security module can send a notification to John Smith and/or an enterprise security administrator indicating the access transaction is not permitted. The enterprise security module can cause an access token that has been granted to the Google Docs™ cloud to be revoked.

Subsequently, the enterprise security module detects an access transaction from OAuth messages, where an enterprise end-user, Jane Doe, is granting a consumer cloud, Google Docs™ cloud, access to a subset of her protected resources stored by the provider cloud, Salesforce® cloud. The enterprise security module stores relationship data that reflects this access transaction. The enterprise security module searches the security profiles for the security profile of Jane Doe and determines that she is the CEO of the enterprise and has a high security level. The enterprise security module applies a policy, which specifies that the enterprise security module can automatically allow or continue to allow a consumer cloud access when the end-user has a high security level and to assign a high-trust cloud type to the consumer cloud. The enterprise security module can allow the access transaction and can dynamically update the cloud trust model to change the Google Docs™ cloud type from an unknown cloud to a high-trust cloud. The policy may also instruct the enterprise control module to send a notification to any resource owners that have been previously denied access transactions relating to the Google Docs™ cloud. The notification can inform the resource owners that the Google Docs™ cloud is now a high-trust cloud. A resource owner can make another attempt to allow the Google Docs™ cloud access to his/her protected resource.

For example, the enterprise security module subsequently detects an access transaction from OAuth messages where John Smith is again attempting to grant the Google Docs™ cloud access to a subset of his protected resources stored by the Salesforce® cloud. The enterprise security module stores relationship data that reflects this access transaction, searches the security profiles for John Smith, and determines that he has a low security level. The cloud trust model now indicates that the provider cloud, Salesforce® cloud, is a high-trust cloud and that the consumer cloud, Google Docs™ cloud, is a high-trust cloud. The enterprise security module applies a policy requiring the enterprise security module to automatically allow the access when the consumer cloud is a high-trust cloud. The enterprise security module determines that the relationship data for the access transaction satisfies the policy criteria and allows the Google Docs™ cloud access to John Smith's protected resources hosted by the Salesforce® cloud. The enterprise security module can send a notification to John Smith indicating the access transaction is permitted. The enterprise security module can also use belief propagation techniques to determine what action to take with regard to the access transaction for John Smith.

Figure 5:
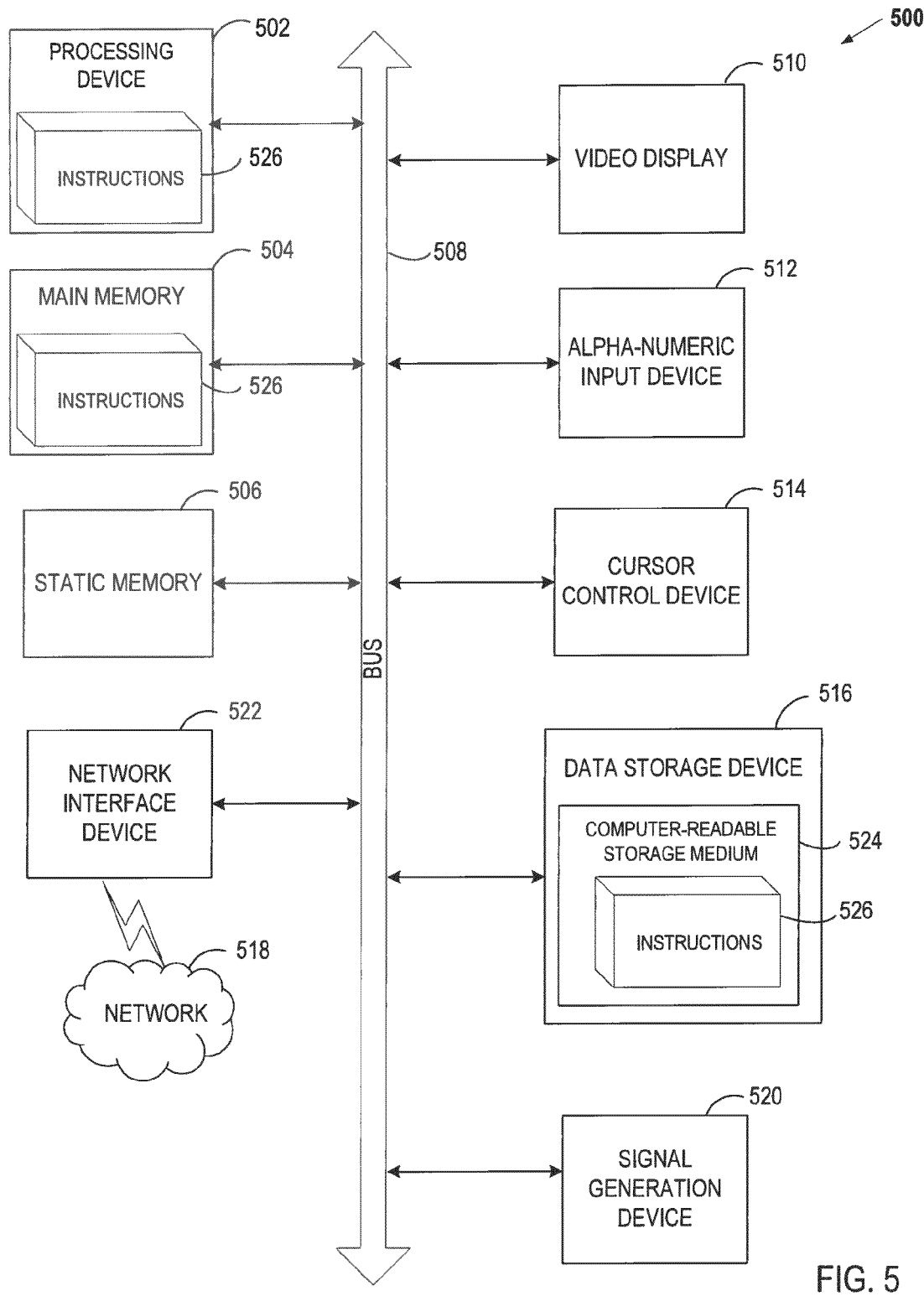
FIG. 5 is a diagram of one embodiment of a computer system for visibility and control over access transactions between clouds using resource authorization messages.

FIG. 5 is a diagram of one embodiment of a computer system for visibility and control over access transactions between clouds using resource authorization messages. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The instructions 526 may further be transmitted or received over a network 518 via the network interface device 522.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein (for example in relation to FIG. 2) can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "generating," "performing," "storing," "updating," "implementing," "determining," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing visibility to and control over resource authorization requests between clouds is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a computing system, an access transaction comprising one or more resource authorization messages transmitted via a resource authorization protocol, the access transaction pertaining to a consumer cloud requesting access to a protected resource hosted by a provider cloud;
   generating, by the computing system, relationship data based on the resource authorization messages, the relationship data indicating the provider cloud hosting the protected resource, the consumer cloud requesting access, and a resource owner that is granting the access;
   identifying a trust cloud type assigned to the consumer cloud; and
   performing, by the computing system, an access control action in relation to the access transaction based on the relationship data, policy data and the trust cloud type assigned to the consumer cloud, wherein the access control action is at least one of allowing the consumer cloud access to the protected resource or denying the consumer cloud access to the protected resource.

2. The method of claim 1, wherein the resource authorization protocol is Open Authentication (OAuth) protocol.

3. The method of claim 1, further comprising:
   storing the policy data specifying cloud type criteria for access control actions;
   storing security profile data for the resource owner indicating a security level for the resource owner; and
   generating a cloud trust model based on the relationship data, the security profile data, and the policy data, wherein the cloud trust model indicates a degree of the consumer cloud being a trusted cloud.

4. The method of claim 3, further comprising:
   detecting a subsequent access transaction based on one or more subsequent resource authorization messages, the access transaction pertaining to access of the protected resource by the consumer cloud, the protected resource hosted by the provider cloud;
   generating the relationship data based on the subsequent resource authorization messages; and
   updating the cloud trust model based on the relationship data pertaining to the subsequent access transaction.

5. The method of claim 3, further comprising:
   implementing the cloud trust model as a graph model, the graph model comprising nodes and edges connecting at least a subset of the nodes, the nodes representing users, consumer clouds, and provider clouds, and the edges representing relationships between the nodes; and
   determining the access control action to be performed using a belief propagation technique and the graph model.

6. The method of claim 1, wherein detecting the access transaction comprises:
   accessing the one or more resource authorization messages originating from outside an enterprise firewall.

7. The method of claim 1, wherein the relationship data further comprises the protected resource to be accessed.

8. A system comprising:
   a memory; and
   a processing device coupled with the memory to
   detect an access transaction comprising one or more resource authorization messages transmitted via a resource authorization protocol, the access transaction pertaining to a consumer cloud requesting access to a protected resource, the protected resource hosted by a provider cloud;
   generate relationship data based on the resource authorization messages, the relationship data indicating the provider cloud hosting the protected resource, the consumer cloud requesting access, and a resource owner that is granting the access;
   identify a trust cloud type assigned to the consumer cloud; and
   perform an access control action in relation to the access transaction based on the relationship data, policy data and the trust cloud type assigned to the consumer cloud, wherein the access control action is at least one of allowing the consumer cloud access to the protected resource or denying the consumer cloud access to the protected resource.

9. The system of claim 8, wherein the resource authorization protocol is Open Authorization (OAuth) protocol.

10. The system of claim 8, wherein:
    the memory is further to store the policy data specifying cloud type criteria for access control actions, and security profile data for the resource owner indicating a security level for the resource owner; and
    the processing device is further to generate a cloud trust model based on the relationship data, the security profile data, and the policy data, wherein the cloud trust model indicates a degree of the consumer cloud being a trusted cloud.

11. The system of claim 10, wherein the processing device is further to:
    detect a subsequent access transaction based on one or more subsequent resource authorization messages, the access transaction pertaining to access of the protected resource by the consumer cloud, the protected resource hosted by the provider cloud;
    generate the relationship data based on the subsequent resource authorization messages; and
    update the cloud trust model based on the relationship data pertaining to the subsequent access transaction.

12. The system of claim 10, wherein the processing device is further to:
    implement the cloud trust model as a graph model, the graph model comprising nodes and edges connecting at least a subset of the nodes, the nodes representing users, consumer clouds, and provider clouds, and the edges representing relationships between the nodes; and determine the access control action to be performed using a belief propagation technique and the graph model.

13. The system of claim 8, further comprising:

at least one of a reverse proxy and a forward proxy to intercept the one or more resource authorization messages originating from outside an enterprise firewall.

14. The system of claim 13, wherein the processing device is to detect the access transaction by:

accessing the resource authorization messages originating from outside the enterprise firewall.

15. A non-transitory computer readable storage medium including instructions that, when executed by a processor, cause the processor to perform a method comprising:

detecting an access transaction comprising one or more resource authorization messages transmitted via a resource authorization protocol, the access transaction pertaining to a consumer cloud requesting access to a protected resource hosted by a provider cloud;

generating, by the processor, relationship data based on the resource authorization messages, the relationship data indicating the provider cloud hosting the protected resource, the consumer cloud requesting access, and a resource owner that is granting the access;

identifying a trust cloud type assigned to the consumer cloud: and performing an access control action in relation to the access transaction based on the relationship data, policy data and the trust cloud type assigned to the consumer cloud, wherein the access control action is at least one of allowing the consumer cloud access to the protected resource or denying the consumer cloud access to the protected resource.

16. The non-transitory computer readable storage medium of claim 15, wherein the resource authorization protocol is Open Authentication (OAuth) protocol.

17. The non-transitory computer readable storage medium of claim 15, further comprising:

storing the policy data specifying cloud type criteria for access control actions;

storing security profile data for the resource owner indicating a security level for the resource owner; and generating a cloud trust model based on the relationship data, the security profile data, and the policy data, wherein the cloud trust model indicates a degree of the consumer cloud being a trusted cloud.

18. The non-transitory computer readable storage medium of claim 17, further comprising:

detecting a subsequent access transaction based on one or more subsequent resource authorization messages, the access transaction pertaining to access of the protected resource by the consumer cloud, the protected resource hosted by the provider cloud;

generating the relationship data based on the subsequent resource authorization messages; and updating the cloud trust model based on the relationship data pertaining to the subsequent access transaction.

19. The non-transitory computer readable storage medium of claim 17, further comprising:

implementing the cloud trust model as a graph model, the graph model comprising nodes and edges connecting at least a subset of the nodes, the nodes representing users, consumer clouds, and provider clouds, and the edges representing relationships between the nodes; and determining the access control action to be performed using a belief propagation technique and the graph model.

20. The non-transitory computer readable storage medium of claim 15, wherein detecting the access transaction comprises:

accessing the one or more resource authorization messages originating from outside an enterprise firewall.

* * * * *